United States Patent
Wang et al.

(10) Patent No.: US 9,960,862 B2
(45) Date of Patent: May 1, 2018

(54) METHOD AND DEVICE FOR DETECTING STANDING-WAVE RATIO

(71) Applicant: Datang Mobile Communications Equipment Co., Ltd., Beijing (CN)

(72) Inventors: Shihua Wang, Beijing (CN); Tao Duan, Beijing (CN); Bin Xue, Beijing (CN); Jieli Wang, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 0 days. days.

(21) Appl. No.: 15/507,818

(22) PCT Filed: Aug. 27, 2015

(86) PCT No.: PCT/CN2015/088280
§ 371 (c)(1),
(2) Date: Mar. 1, 2017

(87) PCT Pub. No.: WO2016/034076
PCT Pub. Date: Mar. 10, 2016

(65) Prior Publication Data
US 2017/0310402 A1    Oct. 26, 2017

(30) Foreign Application Priority Data

Sep. 1, 2014  (CN) .......................... 2014 1 0441687

(51) Int. Cl.
*H04B 17/10* (2015.01)
*H04B 17/18* (2015.01)
(Continued)

(52) U.S. Cl.
CPC ........... *H04B 17/103* (2015.01); *H04B 17/11* (2015.01); *H04B 17/18* (2015.01); *H04W 88/08* (2013.01)

(58) Field of Classification Search
CPC ....... H04B 17/103; H04B 17/11; H04B 17/18
(Continued)

(56) References Cited

U.S. PATENT DOCUMENTS

| 2002/0123363 A1* | 9/2002 | Hildebrand ............ H04B 17/19 455/522 |
| 2005/0084003 A1 | 4/2005 | Duron et al. |

(Continued)

FOREIGN PATENT DOCUMENTS

| CN | 101132240 A | 2/2008 |
| CN | 101146314 A | 3/2008 |

(Continued)

OTHER PUBLICATIONS

Extended European Search Report dated Jul. 14, 2017, from corresponding European Application No. 15838071.7.
(Continued)

*Primary Examiner* — Michael Neff
(74) *Attorney, Agent, or Firm* — DLA Piper LLP (US)

(57) ABSTRACT

Disclosed are a method and device for detecting a standing-wave ratio, which are used for realizing quick and accurate detection of the standing-wave ratio by only using a downlink service signal transmitted by a TD-LTE base station system, thereby preventing a special training sequence from causing additional interference to the base station system. The method comprises: capturing output power detection data (OPD) of a service signal transmitted by the base station system and reflection power detection data (RPD) of a device to be detected in a base station; within a first preset bandwidth range, respectively extracting feedback signals of the OPD and feedback signals of the RPD within a plurality of periods of time according to a preset data length; determining spectrum characteristics of the feedback signals of the OPD and spectrum characteristics of the feedback signals of the RPD respectively corresponding to each period of time, and determining the reflection coefficient of the base station system according to the spectrum characteristics of the feedback signals of the OPD and the spectrum characteristics of the feedback signals of the RPD respectively (Continued)

corresponding to each period of time; and determining the standing-wave ratio of the base station system within the first preset bandwidth range according to the reflection coefficient of the base station system.

11 Claims, 5 Drawing Sheets

(51) Int. Cl.
 *H04B 17/11* (2015.01)
 *H04W 88/08* (2009.01)
(58) Field of Classification Search
 USPC .......................................................... 375/260
 See application file for complete search history.

(56) References Cited

U.S. PATENT DOCUMENTS

2012/0309322 A1 12/2012 Xu et al.
2013/0038387 A1 2/2013 Schmidhammer et al.
2013/0245976 A1 9/2013 Hind

FOREIGN PATENT DOCUMENTS

| CN | 101958756 A | 1/2011 |
| CN | 102185669 A | 9/2011 |
| CN | 102215075 A | 10/2011 |
| CN | 102291192 A | 12/2011 |
| CN | 102307363 A | 1/2012 |
| CN | 102571217 A | 7/2012 |
| CN | 103297154 A | 9/2013 |
| CN | 104243065 A | 12/2014 |
| KR | 10-2004-0056381 | 7/2004 |
| KR | 10-2005-0053052 | 6/2005 |
| WO | 2013/140275 | 9/2013 |

OTHER PUBLICATIONS

Ham, R.E. et al., "4 Microwave Measurements," *The RF and Microwave Handbook*, Dec. 20, 2000, CRC Press, pp. 4-1 through 4-126.

* cited by examiner

METHOD AND DEVICE FOR DETECTING STANDING-WAVE RATIO

This application is a US National Stage of International Application PCT/CN2015/088280, filed on Aug. 27, 2015, designating the United States, and claiming priority to Chinese Patent Application No. 201410441687.2, filed with the Chinese Patent Office on Sep. 1, 2014, and entitled "method and device for detecting standing-wave ratio", which is hereby incorporated by reference in its entirety.

FIELD

The present disclosure relates to the field of communication technology, and particularly to a method and device for detecting standing-wave ratio.

BACKGROUND

In order to guarantee the good operation of a base station communication system, it is necessary to know the standing-wave ratio of the base station system in real time, so the standing-wave ratio of the base station system needs to be detected frequently. In a base station system, vector measurement methods based on Frequency Domain Reflectometry (FDR) technology is widely used to detect the standing-wave ratio.

Frequency domain reflectometry technology is one kind of vector-based measurement technology, whose basic principle is: a set of swept-frequency sine signals is injected into a cable under test, and then reflected signals generated at breakpoints and other reflection points in the cable under test add or minus the input swept-frequency sine signals to generate a corresponding spectrogram, as illustrated in FIG. 1. The vector sum of the signals generates a waveform along the frequency axis, and Fast Fourier Transform (FFT) is performed to transform the vector sum of the signals into frequency-domain information. Distances of the breakpoints or fault points could be calculated according to relative propagation velocity of the cable. The number of waveforms in the frequency relationship diagram is proportionate to the electrical distances of the reflection points in the cable, and result of the Fast Fourier Transform calculation is a characteristic graph of trouble pots represented by actual standing-wave ratio with respect to distance.

Although the frequency domain reflectometry technology is a vector-based measurement technology and its measurement accuracy is pretty high, algorithm implementation of the technology is quite complicated. In addition, as the frequency domain reflectometry technology requires a swept-frequency signal to be formed as the data source, when applied in a TD-LTE base station system, the frequency domain reflectometry technology needs to transmit a specific training sequence to meet the requirements. However, the special training sequence is an interference source for wireless communication systems, therefore, in the prior art, standing-wave ratio detection can't be frequently performed in a base station system. However, due to the need for good operation of a base station communication system, it is very important to know the change of standing-wave ratio of the base station system frequently or in real time.

In summary, to guarantee the good operation of a TD-LTE base station system, the base station system needs to detect its standing-wave ratio frequently and in real time, while the specific training sequence used in the current frequency domain reflectometry technology will produce additional interferences with the communication system, and will affect the transmission quality of the TD-LTE communication system.

SUMMARY

A method and device for detecting standing-wave ratio are provided according to the embodiments of the present disclosure, where instead of by transmitting a specific training sequence, fast and accurate detection of standing-wave ratio could be performed just by using a downlink service signal transmitted by a TD-LTE base station system, thereby avoiding additional interference produced by the specific training sequence with the base station system.

A method for detecting standing-wave ratio according to embodiments of the present disclosure, including:

grabbing output power detection data (OPD) of a service signal transmitted by a base station system and reflection power detection data (RPD) of a device to be detected in the base station;

extracting feedback signals of the OPD and feedback signals of the RPD within a plurality of periods of time, according to a preset data length, within a first preset bandwidth range;

determining spectrum characteristics of the feedback signals of the OPD and spectrum characteristics of the feedback signals of the RPD corresponding to each period of time, as well as determining the reflection coefficient of the base station system on the basis of the spectrum characteristics of the feedback signals of the OPD and the spectrum characteristics of the feedback signals of the RPD corresponding to each period of time; and determining the standing-wave ratio of the base station system within the first preset bandwidth range according to the reflection coefficient of the base station system.

With this method, only a downlink service signal transmitted by a TD-LTE base station system is used, feedback of the transmitted downlink service signal is extracted by extracting a preset data length of feedback signal, thereby simulating a specific training sequence and detecting the standing-wave ratio fast and accurately, avoiding additional interference with the base station system.

Preferably, determining the spectrum characteristics of the feedback signals of the OPD and the spectrum characteristics of the feedback signals of the RPD corresponding to each period of time, includes:

performing Fast Fourier Transform on the feedback signals of the OPD and the feedback signals of the RPD in each period of time, respectively, determining the maximum amplitude of the feedback signals of the OPD in each period of time, as well as the maximum amplitude of the feedback signals of the RPD in each period of time.

Preferably, determining the reflection coefficient of the base station system, on the basis of the spectrum characteristics of the feedback signals of the OPD and the spectrum characteristics of the feedback signals of the RPD corresponding to each period of time, includes:

on the basis of the maximum amplitude of the feedback signals of the OPD in each period of time, as well as the maximum amplitude of the feedback signals of the RPD in the same period of time, determining the reflection coefficient with an error term of the base station system corresponding to the same period of time;

calibrating the reflection coefficient with an error term of the base station system corresponding to each period of time with a preset system error term, to obtain the actual reflection coefficient of the base station system corresponding to each period of time, where the system error term includes a directional error value, a reflected tracking error value, and a source mismatch error value; and calculating the average of the calibrated actual reflection coefficients of the base station system corresponding to all periods of time, where the average is determined as the reflection coefficient of the base station system.

Preferably, the step of presetting the system error term, includes:

grabbing the RPD of a preset training sequence transmitted by the base station system, when the base station system is a short circuit, is an open circuit and has a matched load, respectively;

in a second preset bandwidth range, extracting feedback signals of the RPD of the preset training sequence within a plurality of periods of time according to the preset data length respectively, when the base station system is a short circuit, is an open circuit and has a matched load, where the second preset bandwidth range is larger than the first preset bandwidth range and includes the first preset bandwidth range;

determining the spectrum characteristics of the feedback signals of the RPD of the preset training sequence corresponding to each period of time, when the base station system is a short circuit, is an open circuit and has a matched load;

determining the reflection coefficient with an error term of the base station system when the base station system is a short circuit, by using the spectrum characteristics of the feedback signals of the RPD of the preset training sequence corresponding to each period of time when the base station system is a short circuit; determining the reflection coefficient with an error term of the base station system when the base station system has a matched load, by using the spectrum characteristics of the feedback signals of the RPD of the preset training sequence corresponding to each period of time when the base station system has a matched load; and determining the reflection coefficient with an error term of the base station system when the base station system is an open circuit, by using the spectrum characteristics of the feedback signals of the RPD of the preset training sequence corresponding to each period of time when the base station system is an open circuit; and determining the base station system error term, according to the reflection coefficients with an error term of the base station system when the base station system is a short circuit, is an open circuit and has a matched load.

With this method, the system error term is obtained in a faster and more accurate manner, thereby ensuring more precise calibration of errors of the base station system.

Preferably, on the basis of the maximum amplitude of the feedback signals of the OPD in each period of time, as well as the maximum amplitude of the feedback signals of the RPD in the same period of time, determining the reflection coefficient with an error term of the base station system corresponding to the same period of time, includes:

determining the ratio of the maximum amplitude of the feedback signals of the RPD in each period of time to the maximum amplitude of the feedback signals of the OPD in the same period of time, as the reflection coefficient with an error term of the base station system corresponding to the same period of time.

Preferably, after grabbing the OPD of the service signal transmitted by the base station system and the RPD of the device to be detected in the base station, the method further includes:

removing direct currents from the OPD of the service signal transmitted by the base station system and the RPD of the device to be detected in the base station;

calibrating the mirror signals of both the OPD after the direct current removal and the RPD of the device to be detected in the base station system after the direct current removal;

calibrating the power amplitudes of both the OPD after calibrating the mirror signal thereof and the RPD of the device to be detected in the base station system after calibrating the mirror signal thereof; and performing synchronization compensation on the OPD after the power amplitude calibration and the RPD of the device to be detected in the base station system after the power amplitude calibration.

With this method, interference signals in the OPD of the service signal transmitted by the base station system and the RPD of the device to be detected in the base station system, are removed, and, the power amplitudes of the OPD of the service signal transmitted by the base station system and the RPD of the device to be detected in the base station system are maintained at the same level, thereby ensuring the accuracy of the detected standing-wave ratio.

A device for detecting standing-wave ratio according to embodiments of the present disclosure, includes:

a power data grabbing unit, configured to grab output power detection data (OPD) of a service signal transmitted by a base station system and reflection power detection data (RPD) of a device to be detected in the base station;

a reflected signal extracting unit, configured to extract feedback signals of the OPD and feedback signals of the RPD within a plurality of periods of time, according to a preset data length, within a first preset bandwidth range;

a reflection coefficient determination unit, configured to determine the spectrum characteristics of the feedback signals of the OPD and the spectrum characteristics of the feedback signals of the RPD corresponding to each period of time, as well as to determine the reflection coefficient of the base station system on the basis of the spectrum characteristics of the feedback signals of the OPD and the spectrum characteristics of the feedback signals of the RPD corresponding to each period of time;

a standing-wave ratio determination unit, configured to determine the standing-wave ratio of the base station system within the first preset bandwidth range according to the reflection coefficient of the base station system.

With this device, only a downlink service signal transmitted by a TD-LTE base station system is used, feedback of the transmitted downlink service signal is extracted by extracting a preset data length of feedback signal, thereby simulating a specific training sequence is simulated and detecting the standing-wave ratio fast and accurately, avoiding additional interference with the base station system.

Preferably, when the reflection coefficient determination unit determines the spectrum characteristics of the feedback signals of the OPD and the spectrum characteristics of the feedback signals of the RPD corresponding to each period of time, it is specially configured to:

perform Fast Fourier Transform on the feedback signals of the OPD and the feedback signals of the RPD in each period of time, respectively, determine the maximum amplitude of the feedback signals of the OPD in each period of time, as well as the maximum amplitude of the feedback signals of the RPD in each period of time.

Preferably, when the reflection coefficient determination unit determines the reflection coefficient of the base station system on the basis of the spectrum characteristics of the feedback signals of the OPD and the spectrum characteristics of the feedback signals of the RPD corresponding to each period of time, it is specifically configured to:

on the basis of the maximum amplitude of the feedback signals of the OPD in each period of time, as well as the maximum amplitude of the feedback signals of the RPD in the same period of time, determine the reflection coefficient with an error term of the base station system corresponding to the same period of time;

calibrate the reflection coefficient with an error term of the base station system corresponding to each period of time with a preset system error term, to obtain the actual reflection coefficient of the base station system corresponding to each period of time, where the system error term includes a directional error value, a reflected tracking error value, and a source mismatch error value; and calculate the average of the calibrated actual reflection coefficients of the base system corresponding to all the periods of time, where the average is determined as the reflection coefficient of the base station system.

Preferably, the system further includes:

a system error term determination unit, configured to determine the preset system error term.

Preferably, the system error term determination unit is specifically configured to:

grab the RPD of a preset training sequence transmitted by the base station system, when the base station system is a short circuit, is an open circuit and has a matched load, respectively;

in a second preset bandwidth range, extract feedback signals of the RPD of the preset training sequence within a plurality of periods of time according to the preset data length, when the base station system is a short circuit, is an open circuit and has a matched load, respectively, where the second preset bandwidth range is larger than the first preset bandwidth range and includes the first preset bandwidth range;

determine the spectrum characteristics of the feedback signals of the RPD of the preset training sequence corresponding to each period of time, when the base station system is a short circuit, is an open circuit and has a matched load, respectively;

determine the reflection coefficient with an error term of the base station system when the base station system is a short circuit, by using the spectrum characteristics of the feedback signals of the RPD of the preset training sequence corresponding to each period of time when the base station system is a short circuit; determine the reflection coefficient with an error term of the base station system when the base station system has a matched load, by using the spectrum characteristics of the feedback signals of the RPD of the preset training sequence corresponding to each period of time when the base station system has a matched load; and determine the reflection coefficient with an error term of the base station system when the base station system is an open circuit, by using the spectrum characteristics of the feedback signals of the RPD of the preset training sequence corresponding to each period of time when the base station system is an open circuit; and determine the base station system error term, according to the reflection coefficients with an error term of the base station system when the base station system is a short circuit, is an open circuit and has a matched load.

With this device, the system error term is obtained in a faster and more accurate manner, thereby ensuring more precise calibration of errors of the base station system.

Preferably, when the reflection coefficient determination unit, on the basis of the maximum amplitude of the feedback signals of the OPD in each period of time, as well as the maximum amplitude of the feedback signals of the RPD in the same period of time, determines the reflection coefficient with an error term of the base station system corresponding to the same period of time, it is specially configured to:

determine the ratio of the maximum amplitude of the feedback signals of the RPD in each period of time to the maximum amplitude of the feedback signals of the OPD in the same period of time, as the reflection coefficient with an error term of the base station system corresponding to the same period of time.

Preferably, the power data grabbing unit, is further configured to:

after grabbing the OPD of the service signal transmitted by the base station system and the RPD of the device to be detected in the base station, remove direct currents from the OPD of the service signal transmitted by the base station system and the RPD of the device to be detected in the base station;

calibrate the mirror signals of both the OPD after the direct current removal and the RPD of the device to be detected in the base station system after the direct current removal;

calibrate the power amplitudes of both the OPD after calibrating the mirror signal thereof and the RPD of the device to be detected in the base station system after calibrating the mirror signal thereof; and perform synchronization compensation on the OPD after the power amplitude calibration and the RPD of the device to be detected in the base station system after the power amplitude calibration.

With this device, interference signals in the grabbed measurement data is removed, and, the power amplitudes of the grabbed measurement data are maintained at the same level, thereby ensuring the accuracy of the detected standing-wave ratio.

DETAILED DESCRIPTION

The embodiments of the present disclosure provide a method and device for detecting standing-wave ratio, where instead of by transmitting a specific training sequence, fast and accurate detection of standing-wave ratio could be performed with only a downlink service signal transmitted by a TD-LTE base station system, thereby avoiding additional interference produced by the specific training sequence with the base station system.

The technical solution according to the embodiments of the present disclosure, combining improved frequency domain reflectometry technology and single port calibration techniques of vector network analyzers, could quickly detect standing-wave ratio accurately in real time, and thus avoiding additional interference produced by the specific training sequence with the base station system when detecting standing-wave ratio.

Figure 1:
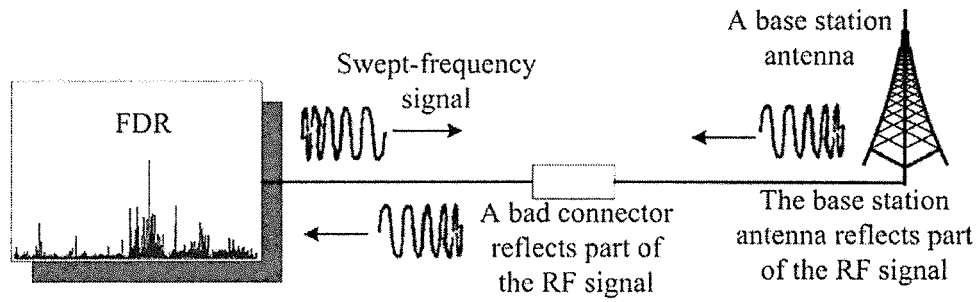
FIG. 1 is a schematic diagram of the frequency domain reflectometry technology.
Figure 2:
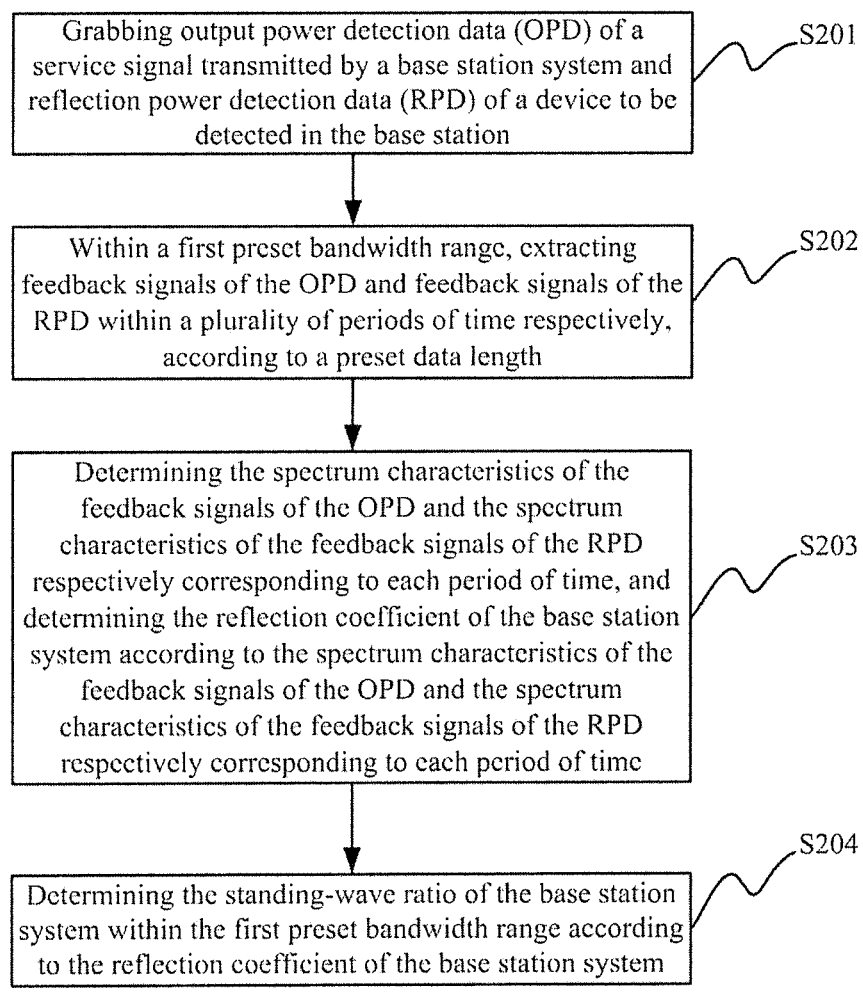
FIG. 2 is a flow chart of the method for detecting standing-wave ratio according to some embodiments of the disclosure.

As illustrated in FIG. 1, the method for detecting standing-wave ratio according to embodiments of the disclosure, includes:

S201: grabbing output power detection data (OPD) of a service signal transmitted by a base station system and reflection power detection data (RPD) of a device to be detected in the base station;

S202: within a first preset bandwidth range, extracting feedback signals of the OPD and feedback signals of the RPD within a plurality of periods of time respectively, according to a preset data length;

S203: determining the spectrum characteristics of the feedback signals of the OPD and the spectrum characteristics of the feedback signals of the RPD respectively corresponding to each period of time, and determining the reflection coefficient of the base station system according to the spectrum characteristics of the feedback signals of the OPD and the spectrum characteristics of the feedback signals of the RPD respectively corresponding to each period of time;

S204: determining the standing-wave ratio of the base station system within the first preset bandwidth range according to the reflection coefficient of the base station system.

Preferably, to improve the accuracy of determining the reflection coefficient of the base station system in S203, a system error term is used for performing system error calibration on the reflection coefficient of the base station. Therefore, the system error term needs to be determined before S203.

In general, before a base station device leaves the factory, the system error term is calibrated once and the system error term for calibration is then stored in an internal memory of the base station system, for example, an E2PROM. Therefore, when a system error calibration is performed, the system error term could be read from the internal memory of the base station system directly, thereby saving a lot of testing time and cost.

Figure 3:
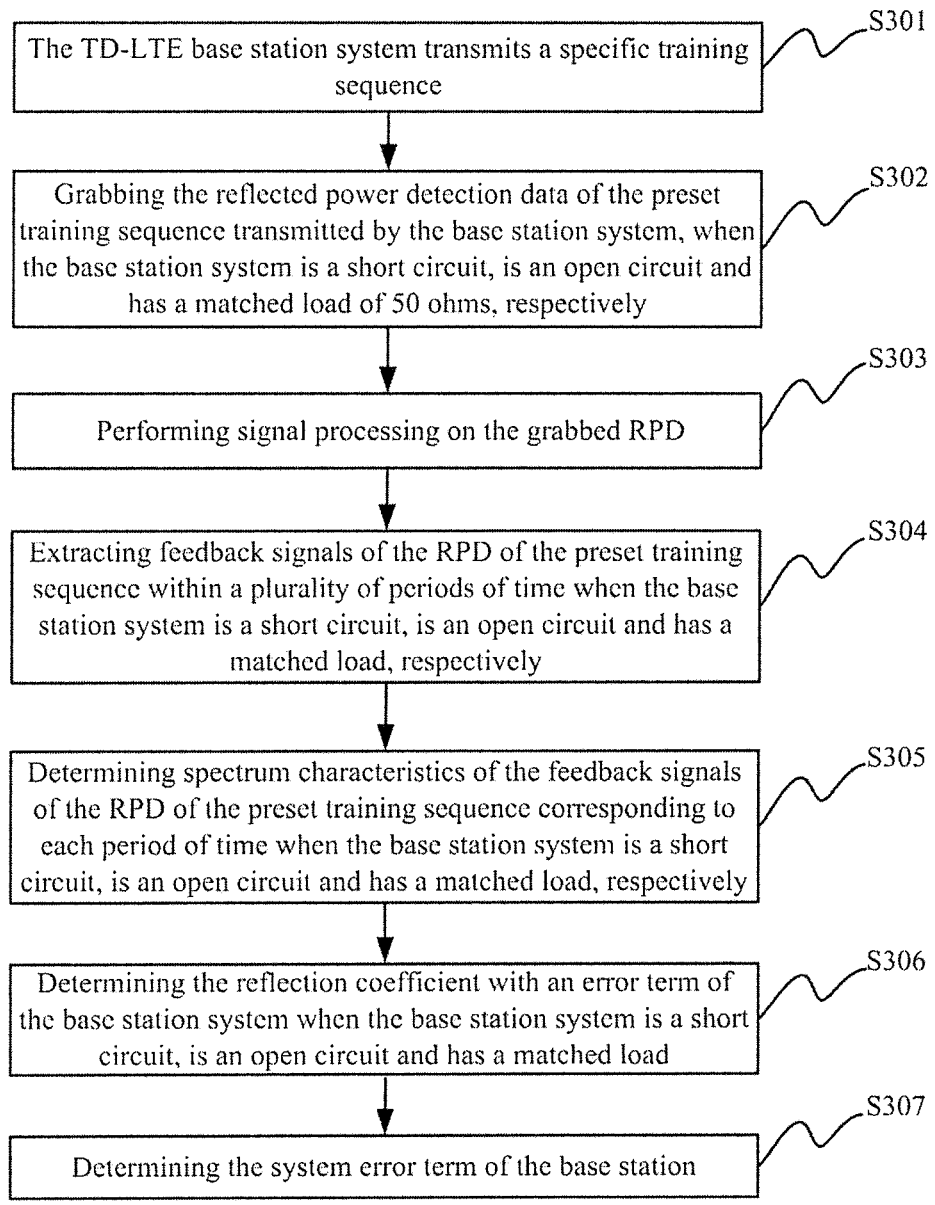
FIG. 3 is a flow chart of a method for detecting system error term according to some embodiments of the disclosure.

As illustrated in FIG. 3, steps of the system error term detection include:

S301: the TD-LTE base station system transmits a preset training sequence, where the preset training sequence is a set of swept-frequency sine signals, which is presented as a specific training sequence in the TD-LTE base station system.

S302: grabbing the reflected power detection (PRD) data of the preset training sequence transmitted by the base station system, when the base station system is a short circuit, is an open circuit and has a matched load of 50 ohms, respectively;

S303: performing the following signal processing on the RPD grabbed when the base station system is a short circuit, is an open circuit and has a matched load of 50 ohms, respectively:

removing direct currents from the RPD grabbed when the base station system is a short circuit, is an open circuit and has a matched load of 50 ohms, respectively;

calibrating the mirror signals of the RPD grabbed when the base station system is a short circuit, is an open circuit and has a matched load of 50 ohms, respectively;

where calibrating the mirror signal of the RPD means extracting the real part signal and the imaginary part signal of the mirror signal of the RPD respectively, and calibrating the amplitudes of the real part signal and the imaginary part signal respectively; for the calibration of the amplitudes, amplitude difference between the real part signal and the imaginary part signal needs to be calculated and then digital compensation is made for the calculated amplitude difference;

performing synchronization compensation on the RPD grabbed when the base station system is a short circuit, is an open circuit and has a matched load of 50 ohms, respectively; which means, with RPD grabbed in any one of the situations as a benchmark, performing time-domain synchronization on RPD grabbed in the other two situations;

where calibrating the mirror signal of the RPD means extracting the real part signal and the imaginary part signal of the mirror signal of the RPD respectively, and calibrating the phases of the real part signal and the imaginary part signal respectively; for the calibration of the phases, phase difference between the real part signal and the imaginary part signal needs to be calculated and then digital compensation is made for the calculated phase difference;

S304: after the synchronization compensation on the RPD grabbed when the base station system is a short circuit, is an open circuit and has a matched load, within a preset bandwidth range B1, according to a preset data length, extracting feedback signals of the RPD of the preset training sequence within a plurality of periods of time when the base station system is a short circuit, is an open circuit and has a matched load, respectively;

S305: determining spectrum characteristics of the feedback signals of the RPD of the preset training sequence corresponding to each period of time when the base station system is a short circuit, is an open circuit and has a matched load, respectively; where the spectrum characteristics is the maximum amplitude of the feedback signals of the RPD of the preset training sequence corresponding to each period of time;

S306: determining the reflection coefficient with an error term of the base station system when the base station system is a short circuit, by using the maximum amplitude of the feedback signals of the RPD of the preset training sequence corresponding to each period of time when the base station system is a short circuit; determining the reflection coefficient with an error term of the base station system when the base station system has a matched load of 50 ohms, by using the maximum amplitude of the feedback signals of the RPD of the preset training sequence corresponding to each period of time when the base station system has a matched load of 50 ohms; and determining the reflection coefficient with an error term of the base station system when the base station system is an open circuit, by using the maximum amplitude of the feedback signals of the RPD of the preset training sequence corresponding to each period of time when the base station system is an open circuit;

S307: determining the system error term of the base station, according to the reflection coefficients with an error term of the base station system when the base station system is a short circuit, is an open circuit and has a matched load of 50 ohms, where the system error term includes a directional error value, a reflected tracking error value, and a source mismatch error value.

Preferably, in S303, the signal processing performed on the RPD of the device to be detected in the base station and the OPD of the service signal transmitted by the base station system, could be performed not only on the reflected power detection data of the preset training sequence transmitted by the base station system, which is grabbed when the base station system is a short circuit, is an open circuit and has a matched load of 50 ohms, but also on extracted feedback signals of the RPD of the preset training sequence within a plurality of periods of time when the base station system is a short circuit, an open circuit and has a matched load, to ensure the accuracy of the system error term detection.

Figure 4:
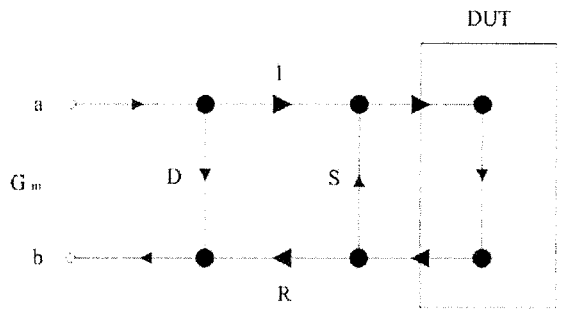
FIG. 4 is a schematic diagram of a single port calibration model of a vector network analyzer.

Refer to FIG. 4, it is described below about determining the system error term of the base station device with single port calibration techniques of a vector network analyzer.

According to the single port calibration techniques of a vector network analyzer, the reflection coefficient with the error term of the system could be calculated by the following formula:

$$\Gamma_m = \frac{b}{a} = D + \frac{R * S_{11}}{1 - S * S_{11}} \quad \text{Formula 1}$$

where $\Gamma_m$ is the reflection coefficient with the error term of the system, a is the input signal stream, b is the output signal stream, D is the directional error value, R is the reflected tracking error value, S is the source mismatch error value and $S_{11}$ is the actual reflection coefficient of the system.

Preferably, three measurements is carried out respectively, in three situations that the base station system is a short circuit, an open circuit and has a matched load of 50 ohms, to determine the reflection coefficient with the system error term of the base station system, i.e., to determine three error values existing in the system, i.e., the directional error value D, the reflected tracking error value R, and the source mismatch error value S. The detailed calculation steps include:

the first measurement is carried out when the base station is a short circuit, where the reflection coefficient with the error term of the base station system is measured, which is $M_1$, and the actual reflection coefficient of the system $S_{11}$ equals −1, and Formula 1 becomes:

$$M_1 = D - \frac{R}{1+S} \quad \text{Formula 2}$$

the second measurement is carried out when the base station is an open circuit, where the reflection coefficient with the error term of the base station system is measured, which is $M_2$, and the actual reflection coefficient of the system $S_{11}$ equals 1, and Formula 1 becomes:

$$M_2 = D + \frac{R}{1-S} \quad \text{Formula 3}$$

the third measurement is carried out when the base station has a matched load of 50 ohms, where the reflection coefficient with the error term of the base station system is measured, which is $M_3$, and the actual reflection coefficient of the system $S_{11}$ equals 0, and Formula 1 becomes:

$$M_3 = D \quad \text{Formula 4}$$

The system error term, i.e., the directional error value D, the reflected tracking error value R, and the source mismatch error value S, could be calculated with Formula 2, 3 and 4, i.e.

$$D = M_3$$
$$S = \frac{M_1 + M_2 - 2M_3}{M_2 - M_1}$$
$$R = (M_2 - M_3) * (1 - S)$$

Preferably, to ensure the accuracy of the system error term detection data, mirror signal of the preset training sequence could be calibrated before S201.

Below is the flow of a method for obtaining a more accurate standing-wave ratio.

Figure 5:
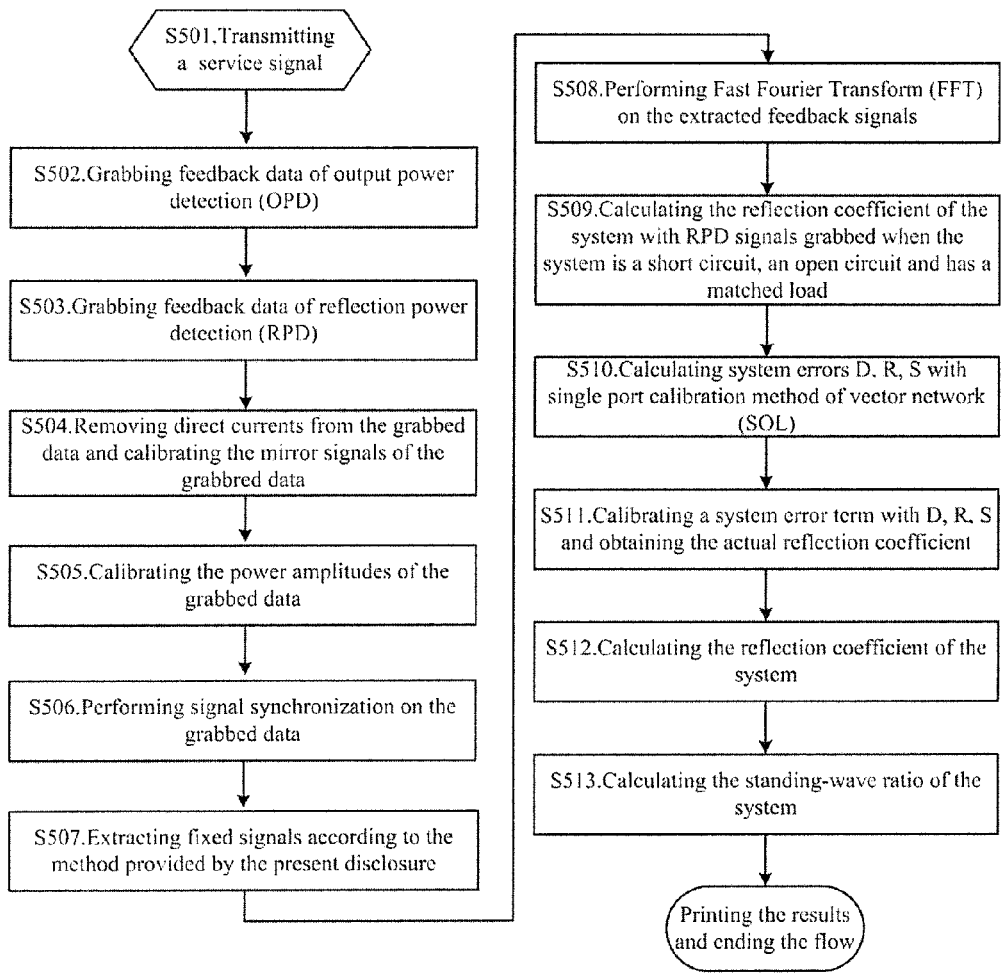
FIG. 5 is a flow chart of detecting standing-wave ratio according to some embodiments of the disclosure.

Referring to FIG. 5, the detailed flow of standing-wave ratio detection includes the following steps.

Figure 6:
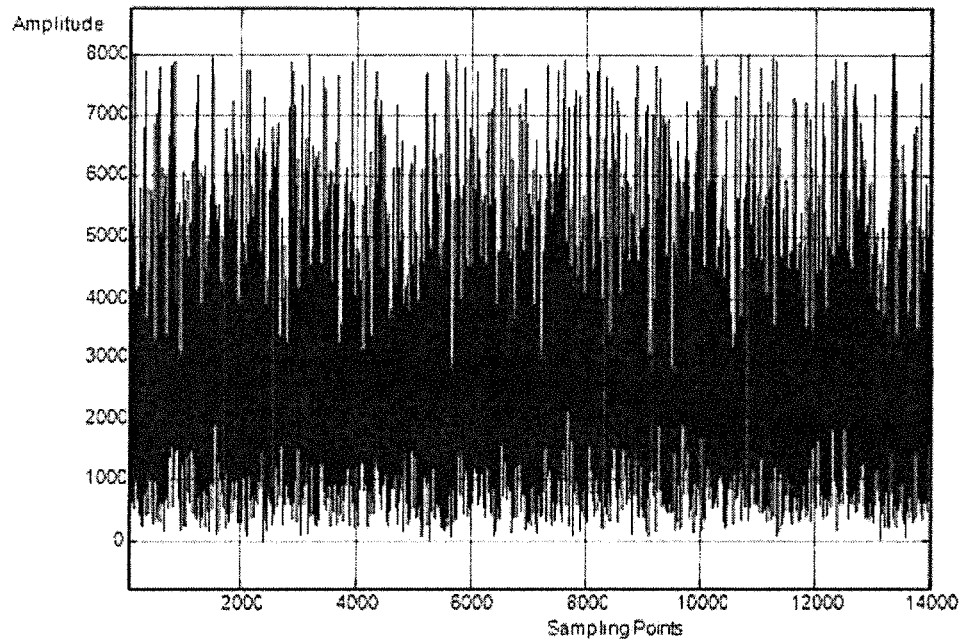
FIG. 6 is a time-domain characteristics diagram of a service signal transmitted by a base station according to some embodiments of the disclosure.
Figure 7:
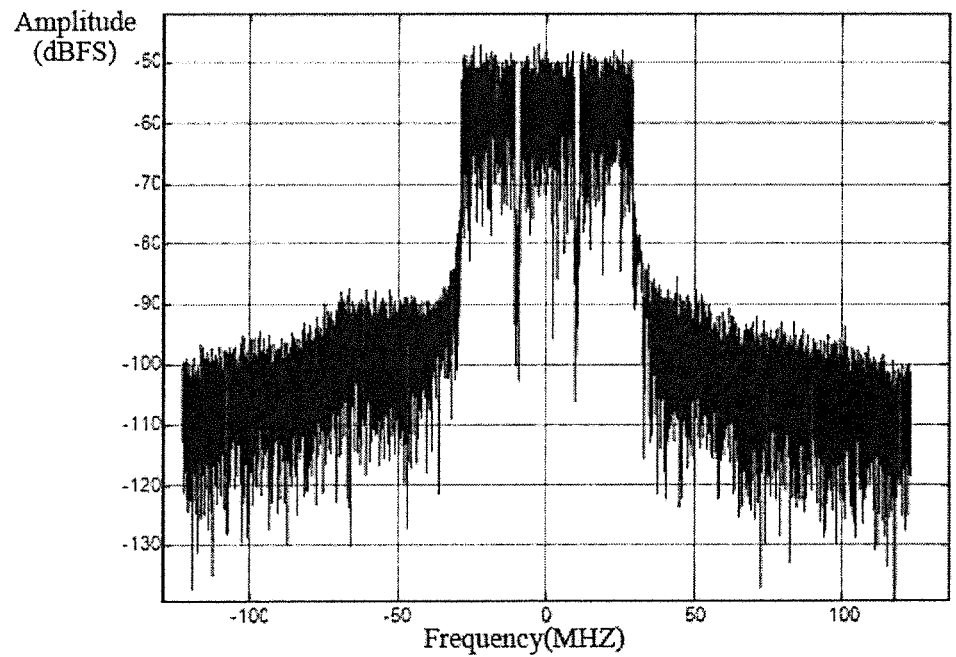
FIG. 7 is a frequency-domain characteristics diagram of a service signal transmitted by a base station according to some embodiments of the disclosure.

S501: The TD-LTE base station system transmits a downlink service signal, where the time-domain characteristics of the service signal transmitted by a base station are illustrated in FIG. 6 and FIG. 7.

Preferably, to ensure the accuracy of the standing-wave ratio detection data, the mirror signal of the downlink service signal transmitted by the TD-LTE base station system could be calibrated before S501.

S502: grabbing data of the output power detection (OPD) of the service signal transmitted by the base station system.

Working conditions of non-linear internal devices of the base station system, such as a power amplifier, could be more accurately reflected with the output power detection data of the service signal transmitted by the base station system, to improve the accuracy of standing-wave ratio detection.

S503: grabbing the RPD of a device to be detected, such as an antenna, in the base station system.

S504: removing direct currents from the OPD of the service signal transmitted by the base station system and the RPD of the device to be detected in the base station. Both the OPD of the service signal transmitted by the base station system and the RPD of the device to be detected in the base station have large direct current components, which would affect the accuracy of the detection data, thus direct currents need to be removed from the OPD of the service signal transmitted by the base station system and the RPD of the device to be detected in the base station after grabbing the OPD of the service signal transmitted by the base station system and the RPD of the device to be detected in the base station. Furthermore, as mirror signals would appear during the transmission process, in order to remove interference signals in the OPD of the service signal transmitted by the base station system and the RPD of the device to be detected in the base station, mirror signals of the OPD after the direct current removal and mirror signals of the RPD of the device to be detected in the base station after the direct current removal are calibrated.

S505: calibrating the power amplitude of the OPD after calibrating the mirror signal thereof and the power amplitude of the RPD of the device to be detected in the base station system after calibrating the mirror signal thereof. Due to the uncertainty of the transmitting power of the service signal, to ensure the accuracy of measurement, it is necessary to calibrate the power amplitudes of the OPD after calibrating the mirror signal thereof and the power amplitude of the RPD of the device to be detected in the base station system after calibrating the mirror signal thereof.

S506: performing synchronization compensation on the OPD after the power amplitude calibration and the RPD of the device to be detected in the base station system after the power amplitude calibration. There must be a time delay and phase delay between the acquisition of the OPD of the service signal transmitted by the base station system and the RPD of the device to be detected in the base station, and the signal port calibration techniques of vector network analyzers relate to phase information of signal of the grabbed power data, so synchronization compensation must be performed on the OPD after the power amplitude calibration and the RPD of the device to be detected in the base station system after the power amplitude calibration.

Preferably, when calibrating the power amplitudes of both the OPD after calibrating the mirror signal thereof and the RPD of the device to be detected in the base station system after calibrating the mirror signal thereof, calibrating the power amplitudes of both the OPD after calibrating the mirror signal thereof and the RPD of the device to be detected in the base station system after calibrating the mirror signal thereof with the power amplitude of the RPD obtained in the calibration before the base station leaves the factory as a benchmark.

The signal processing in the steps of S504 to S506, could be performed not only on the OPD of the service signal transmitted by the base station system and the RPD of the device to be detected in the base station, both of which are grabbed in S502 and S503, but also on the feedback signals of the OPD and the feedback signals of RPD within a plurality of periods of time, to ensure the accuracy of the standing-wave ratio detection.

S507: extracting feedback signals of the OPD and feedback signals of the RPD within a plurality of periods of time, according to a preset data length, within the range of a preset bandwidth $B_2$, where the range of $B_1$ is larger than and includes the range of $B_2$. If the range of $B_1$ is smaller than the range of $B_2$, the base station system error term stored in the memory of the TD-LTE base station can't be configured to determine the actual reflection coefficient of the base station system corresponding to periods of time within which feedback signals should be extracted beyond bandwidth range.

S508: performing Fast Fourier Transform (FFT) on the feedback signals of the OPD and the feedback signals of the RPD in each period of time.

Since the OPD of the service signal transmitted by the base station system and the RPD of the device to be detected in the base station system represent time domain characteristics of the power amplitude of the service signal, within the range of the preset bandwidth $B_2$, if the data length of the feedback signals of the OPD is F, and it is known that the data length of sampling points obtained by sampling feedback signals of the OPD extracted within the bandwidth $B_2$ at the time domain is L, then the number of the feedback signals of the OPD is T, and T=L/F, which means the OPD have feedback signals of T periods of time; within the range of the preset bandwidth $B_2$, if the data length of the feedback signals of the RPD is F, and it is known that the data length of sampling points obtained by sampling the feedback signals of the RPD extracted within the bandwidth $B_2$ at the time domain is L, then the number of the feedback signals of the RPD is T, and T=L/F, which means the RPD also have feedback signals of T periods of time.

Preferably, in S507 and S508, Fast Fourier Transform could be firstly performed on the OPD of the service signal transmitted by the base station system and the RPD of the device to be detected in the base station, to get a frequency domain characteristics diagram of the feedback signals, then within the range of the preset bandwidth $B_2$, according to a preset frequency band, extracting both the feedback signals of the OPD and the feedback signals of the RPD of several bands, respectively. Fast Fourier Transform has been firstly performed on the grabbed OPD of the service signal transmitted by the base station system and the grabbed RPD of the device to be detected in the base station, therefore, both frequency domain characteristics diagram of the feedback signals of the grabbed OPD of the service signal transmitted by the base station system and the frequency domain characteristics diagram of the feedback signals of the grabbed RPD of the device to be detected in the base station have been obtained. Then within the preset bandwidth $B_2$, the frequency band of the feedback signals of the grabbed OPD is G, so the number of the feedback signals of the grabbed OPD is T=$B_2$/G, which means the OPD has T bands of feedback signals; within the preset bandwidth $B_2$, the frequency band of the feedback signals of the grabbed RPD is G, so the number of the feedback signals of the grabbed RPD is T=$B_2$/G, which means the RPD has T bands of feedback signals.

Preferably, since the TD-LTE base station is OFDM-modulated, there is a certain overlap in its spectrum, which would bring damage to the spectrum information of the extracted feedback signals. But after the extracted feedback signals have been averaged, with the decrease of the fixed frequency band G, the damage to the spectrum information of the extracted feedback signals would decease largely, and thus the detection precision is ensured.

S509: determining the spectrum characteristics of the feedback signals of the OPD and the spectrum characteristics of the feedback signals of the RPD corresponding to each period of time, i.e., choosing the maximum peak value of the feedback signals of the OPD corresponding to each period of time, as well as choosing the maximum peak value of the feedback signals of the RPD corresponding to each period of time. Calculating the ratio of the maximum peak value of the feedback signals of the RPD corresponding to each period of time to the maximum peak value of the feedback signals of the OPD corresponding to the same period of time, which is determined as the reflection coefficient with an error term of the base station system corresponding to the same period of time. Corresponding to any period of time, formula for calculating the reflection coefficient with the error term in the base station system is:

$$\Gamma_m = \frac{b}{a},$$

where a is the maximum peak value of the feedback signals of the OPD of the base station system corresponding to the period of time, and b is the maximum peak value of the feedback signals of the RPD of the device to be detected in the base station system corresponding to the same period of time.

S510: retrieving a pre-determined system error term from the base station system's memory.

S511: calibrating the reflection coefficient with the error term of the base station system corresponding to each period of time by using the system error term retrieved in S510, to obtain the actual reflection coefficient of the base station system corresponding to each period of time, where the system error term includes a directional error value, a reflected tracking error value, and a source mismatch error value.

Preferably, with the preset system error term, the reflection coefficient with the error term of the base station system corresponding to each period of time could be calibrated by the following formula:

$$\Gamma_m = D + \frac{R*S_{11}}{1-S*S_{11}},$$

Where $S_{11}$ is the actual reflection coefficient of the system, D is the directional error value, R is the reflected tracking error value, S is the source mismatch error value, $\Gamma_m$ is the reflection coefficient with the error term of the system.

S512: calculating the average $\Gamma$ of the calibrated actual reflection coefficients of the base station system corresponding to all the periods of time, which means the calibrated actual reflection coefficients of the base station system corresponding to all the periods of time are added and then divided by the number T of the extracted feedback signals of the OPD/RPD.

S513: determining the standing-wave ratio of the base station system within the preset bandwidth $B_2$ according to the reflection coefficient of the base station system, where the formula for determining the standing-wave ratio of the base station system is:

$$VSWR = \frac{1+|\Gamma|}{1-|\Gamma|}$$

where VSWR is the standing-wave ratio of the base station system, and $\Gamma$ is the reflection coefficient of the base station system.

Figure 8:
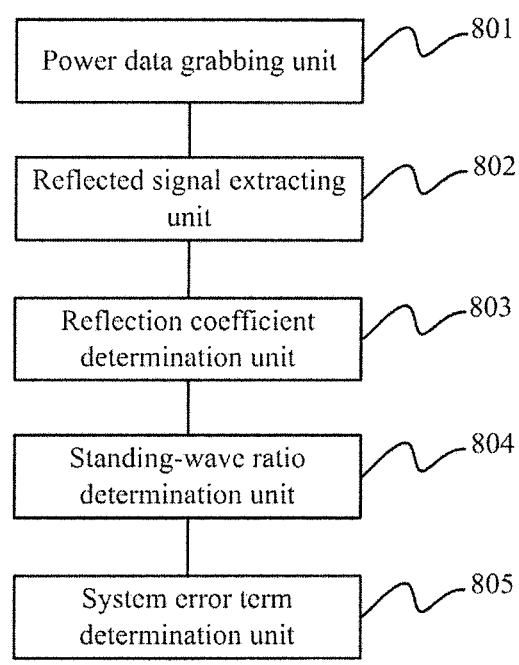
FIG. 8 is a structural schematic diagram of a device for detecting standing-wave ratio according to some embodiments of the disclosure.

FIG. 8 illustrates a device for detecting standing-wave ratio according to embodiments of the preset disclosure, which includes:

a power data grabbing unit 801, configured to grab output power detection data (OPD) of a service signal transmitted by a base station system and reflection power detection data (RPD) of a device to be detected in the base station;

a reflected signal extracting unit 802, configured to extract feedback signals of the OPD and feedback signals of the RPD within a plurality of periods of time, according to a preset data length, within a first preset bandwidth range;

a reflection coefficient determination unit 803, configured to determine the spectrum characteristics of the feedback signals of the OPD and the spectrum characteristics of the feedback signals of the RPD corresponding to each period of time, as well as to determine the reflection coefficient of the base station system on the basis of the spectrum characteristics of the feedback signals of the OPD and the spectrum characteristics of the feedback signals of the RPD corresponding to each period of time;

a standing-wave ratio determination unit 804, configured to determine the standing-wave ratio of the base station system within the first preset bandwidth range according to the reflection coefficient of the base station system.

Preferably, when the reflection coefficient determination unit 803 determines the spectrum characteristics of the feedback signals of the OPD and the spectrum characteristics of the feedback signals of the RPD corresponding to each period of time, it is specially configured to:

perform Fast Fourier Transform on the feedback signals of the OPD and the feedback signals of the RPD in each period of time, respectively, determine the maximum amplitude of the feedback signals of the OPD in each period of time, as well as the maximum amplitude of the feedback signals of the RPD in each period of time.

Preferably, when the reflection coefficient determination unit 803 determines the reflection coefficient of the base station system on the basis of the spectrum characteristics of the feedback signals of the OPD and the spectrum characteristics of the feedback signals of the RPD corresponding to each period of time, it is specifically configured to:

on the basis of the maximum amplitude of the feedback signals of the OPD in each period of time, as well as the maximum amplitude of the feedback signals of the RPD in the same period of time, determine the reflection coefficient with an error term of the base station system corresponding to the same period of time;

calibrate the reflection coefficient with an error term of the base station system corresponding to each period of time with a preset system error term, to obtain the actual reflection coefficient of the base station system corresponding to each period of time, where the system error term includes a directional error value, a reflected tracking error value, and a source mismatch error value; and calculate the average of the calibrated actual reflection coefficients of the base system corresponding to all the periods of time, where the average is determined as the reflection coefficient of the base station system.

Preferably, the system further includes:

a system error term determination unit 805, configured to determine the preset system error term.

Preferably, the system error term determination unit 805 is specifically configured to:

grab the RPD of a preset training sequence transmitted by the base station system, when the base station system is a short circuit, is an open circuit and has a matched load, respectively;

in a second preset bandwidth range, extract feedback signals of the RPD of the preset training sequence within a plurality of periods of time, according to the preset data length, when the base station system is a short circuit, is an open circuit and has a matched load, respectively, where the second preset bandwidth range is larger than the first preset bandwidth range and includes the first preset bandwidth range;

determine the spectrum characteristics of the feedback signals of the RPD of the preset training sequence corresponding to each period of time, when the base station system is a short circuit, is an open circuit and has a matched load, respectively;

determine the reflection coefficient with an error term of the base station system when the base station system is a short circuit, by using the spectrum characteristics of the feedback signals of the RPD of the preset training sequence corresponding to each period of time when the base station system is a short circuit; determine the reflection coefficient with an error term of the base station system when the base station system has a matched load, by using the spectrum characteristics of the feedback signals of the RPD of the preset training sequence corresponding to each period of time when the base station system has a matched load; and determine the reflection coefficient with an error term of the base station system when the base station system is an open circuit, by using the spectrum characteristics of the feedback signals of the RPD of the preset training sequence corresponding to each period of time when the base station system is an open circuit; and determine the base station system error term, according to the reflection coefficients with an error term of the base station system when the base station system is a short circuit, is an open circuit and has a matched load.

Preferably, when the reflection coefficient determination unit 803, on the basis of the maximum amplitude of the feedback signals of the OPD in each period of time, as well as the maximum amplitude of the feedback signals of the RPD in the same period of time, determines the reflection coefficient with an error term of the base station system corresponding to the same period of time, it is specially configured to:

determine the ratio of the maximum amplitude of the feedback signals of the RPD in each period of time to the maximum amplitude of the feedback signals of the OPD in the same period of time, as the reflection coefficient with an error term of the base station system corresponding to the same period of time.

Preferably, the power data grabbing unit 801 is further configured to:

after grabbing the OPD of the service signal transmitted by the base station system and the RPD of the device to be detected in the base station, remove direct currents from the OPD of the service signal transmitted by the base station system and the RPD of the device to be detected in the base station;

calibrate the mirror signals of both the OPD after the direct current removal and the RPD of the device to be detected in the base station system after the direct current removal;

calibrate the power amplitudes of both the OPD after calibrating the mirror signal thereof and the RPD of the device to be detected in the base station system after calibrating the mirror signal thereof; and perform synchronization compensation on the OPD after the power amplitude calibration and the RPD of the device to be detected in the base station system after the power amplitude calibration.

Preferably, the power data grabbing unit 801, the reflected signal extracting unit 802, the reflection coefficient determination unit 803, the standing-wave ratio determination unit 804, and the system error term determination unit 805 could all be implemented in a processor.

In conclusion, in the present disclosure, combining improved frequency domain reflectometry technology and single port calibration techniques of vector network analyzers, with a downlink service signal transmitted by a TD-LTE base station system, the standing-wave ratio of the base station system could be frequently detect in real time, and accurate detection results are obtained, the object of detecting standing-wave ratio detection fast is achieved, thereby avoiding additional interference produced by the transmitted specific training sequence with the TD-LTE communication system. No additional hardware costs need to be added to the existing base station system, and with a few computing resources of the base station system, the standing-wave ratio of the base station could be detected quickly and accurately. For base station hardware maintenance and testing personnel, when detecting the standing-wave ratio of a base station device, there is no need to carry any cumbersome and expensive instrument, or to carry out the calibration whenever the base station system is a short circuit, an open circuit or has a matched load, and only calibration data stored in an internal memory of the base station system is used to detect the standing-wave ratio of the base station system accurately.

It will be appreciated by those skilled in the art that the embodiments of the present disclosure may be provided as a method, system, or computer program product. Thus, the present disclosure may take the form of a fully hardware embodiment, a fully software embodiment, or an embodiment combining software and hardware aspects. Moreover, the invention may take the form of a computer program product implemented on one or more computer usable storage media (including but not limited to magnetic disk storage and optical storage, etc.) containing computer usable program code therein.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the disclosure without departing from the spirit and scope of the disclosure. Thus the present disclosure is also intended to encompass these modifications and variations thereto so long as the modifications and variations come into the scope of the claims appended to the present disclosure and their equivalents.

The invention claimed is:

1. A method for detecting standing-wave ratio, the method comprising:

grabbing output power detection data (OPD) of a service signal transmitted by a base station system and reflection power detection data (RPD) of a device to be detected in the base station;

extracting feedback signals of the OPD and feedback signals of the RPD within a plurality of periods of time, according to a preset data length, within a first preset bandwidth range;

determining spectrum characteristics of the feedback signals of the OPD and spectrum characteristics of the feedback signals of the RPD corresponding to each period of time, as well as determining a reflection coefficient of the base station system on the basis of the spectrum characteristics of the feedback signals of the OPD and the spectrum characteristics of the feedback signals of the RPD corresponding to each period of time; and determining a standing-wave ratio of the base station system within the first preset bandwidth range according to the reflection coefficient of the base station system;

wherein determining the spectrum characteristics of the feedback signals of the OPD and the spectrum characteristics of the feedback signals of the RPD corresponding to each period of time comprises:

performing Fast Fourier Transform on the feedback signals of the OPD and the feedback signals of the RPD in each period of time, respectively, determining a maximum amplitude of the feedback signals of the OPD in each period of time and a maximum amplitude of the feedback signals of the RPD in each period of time.

2. The method according to claim 1, wherein determining the reflection coefficient of the base station system, on the basis of the spectrum characteristics of the feedback signals of the OPD and the spectrum characteristics of the feedback signals of the RPD corresponding to each period of time, comprises:

on the basis of the maximum amplitude of the feedback signals of the OPD in each period of time, as well as the maximum amplitude of the feedback signals of the RPD in the same period of time, determining the reflection coefficient with an error term of the base station system corresponding to the same period of time;

calibrating the reflection coefficient with an error term of the base station system corresponding to each period of time with a preset system error term, to obtain an actual reflection coefficient of the base station system corresponding to each period of time, wherein the system error term comprises a directional error value, a reflected tracking error value, and a source mismatch error value; and calculating an average of the calibrated actual reflection coefficients of the base station system corresponding to all the periods of time, wherein the average is determined as the reflection coefficient of the base station system.

3. The method according to claim 2, wherein the steps of presetting the system error term, comprise:

grabbing the RPD of a preset training sequence transmitted by the base station system, when the base station system is a short circuit, is an open circuit and has a matched load, respectively;

in a second preset bandwidth range, extracting feedback signals of the RPD of the preset training sequence within a plurality of periods of time according to the preset data length respectively, when the base station system is a short circuit, is an open circuit and has a matched load, wherein the second preset bandwidth range is larger than the first preset bandwidth range and includes the first preset bandwidth range;

determining the spectrum characteristics of the feedback signals of the RPD of the preset training sequence corresponding to each period of time, when the base station system is a short circuit, is an open circuit and has a matched load;

determining the reflection coefficient with an error term of the base station system when the base station system is a short circuit, by using the spectrum characteristics of the feedback signals of the RPD of the preset training sequence corresponding to each period of time when the base station system is a short circuit; determining the reflection coefficient with an error term of the base station system when the base station system has a matched load, by using the spectrum characteristics of the feedback signals of the RPD of the preset training sequence corresponding to each period of time when the base station system has a matched load; and determining the reflection coefficient with an error term of the base station system when the base station system is an open circuit, by using the spectrum characteristics of the feedback signals of the RPD of the preset training sequence corresponding to each period of time when the base station system is an open circuit; and determining the base station system error term, according to the reflection coefficients with an error term of the base station system when the base station system is a short circuit, is an open circuit and has a matched load.

4. The method according to claim 2, wherein on the basis of the maximum amplitude of the feedback signals of the OPD in each period of time, as well as the maximum amplitude of the feedback signals of the RPD in the same period of time, determining the reflection coefficient with an error term of the base station system corresponding to the same period of time, comprises:

determining the ratio of the maximum amplitude of the feedback signals of the RPD in each period of time to the maximum amplitude of the feedback signals of the OPD in the same period of time, as the reflection coefficient with an error term of the base station system corresponding to the same period of time.

5. The method according to claim 1, wherein after grabbing the OPD of the service signal transmitted by the base station system and the RPD of the device to be detected in the base station, the method further comprises:

removing direct currents from the OPD of the service signal transmitted by the base station system and the RPD of the device to be detected in the base station;

calibrating mirror signals of both the OPD after the direct current removal and the RPD of the device to be detected in the base station system after the direct current removal;

calibrating power amplitudes of both the OPD after calibrating the mirror signal thereof and the RPD of the device to be detected in the base station system after calibrating the mirror signal thereof; and performing synchronization compensation on the OPD after the power amplitude calibration and the RPD of the device to be detected in the base station system after the power amplitude calibration.

6. A device for detecting standing-wave ratio, the device comprises at least one processor and a memory for storing a computer readable program;

wherein the at least one processor executes the computer readable program to:

grab output power detection data (OPD) of a service signal transmitted by a base station system and reflection power detection data (RPD) of a device to be detected in the base station;

extract feedback signals of the OPD and feedback signals of the RPD within a plurality of periods of time, according to a preset data length, within a first preset bandwidth range;

determine a spectrum characteristics of the feedback signals of the OPD and the spectrum characteristics of the feedback signals of the RPD corresponding to each period of time, as well as to determine a reflection coefficient of the base station system, on the basis of the spectrum characteristics of the feedback signals of the OPD and the spectrum characteristics of the feedback signals of the RPD corresponding to each period of time;

determine a standing-wave ratio of the base station system within the first preset bandwidth range according to the reflection coefficient of the base station system;

wherein the at least one processor executes the computer readable program to determine the spectrum characteristics of the feedback signals of the OPD and the spectrum characteristics of the feedback signals of the RPD corresponding to each period of time by:

performing Fast Fourier Transform on the feedback signals of the OPD and the feedback signals of the RPD in each period of time, respectively, determine a maximum amplitude of the feedback signals of the OPD in each period of time and a maximum amplitude of the feedback signals of the RDP in each period of time.

7. The device according to claim 6, wherein the at least one processor executes the computer readable program to determine the reflection coefficient of the base station system on the basis of the spectrum characteristics of the feedback signals of the OPD and the spectrum characteristics of the feedback signals of the RPD corresponding to each period of time by:

on the basis of the maximum amplitude of the feedback signals of the OPD in each period of time, as well as the maximum amplitude of the feedback signals of the RPD in the same period of time, determining the reflection coefficient with an error term of the base station system corresponding to the same period of time;

calibrating the reflection coefficient with an error term of the base station system corresponding to each period of time with a preset system error term, to obtain an actual reflection coefficient of the base station system corresponding to each period of time, wherein the system error term comprises a directional error value, a reflected tracking error value, and a source mismatch error value; and calculating an average of the calibrated actual reflection coefficients of the base system corresponding to all the periods of time, wherein the average is determined as the reflection coefficient of the base station system.

8. The electronic device according to claim 7, wherein the at least one processor executes the computer readable program the:

to determine the preset system error term.

9. The electronic device according to claim 8, wherein the at least one processor executes the computer readable program to:

grab the RPD of a preset training sequence transmitted by the base station system, when the base station system is a short circuit, is an open circuit and has a matched load, respectively;

in a second preset bandwidth range, extract feedback signals of the RPD of the preset training sequence within a plurality of periods of time according to the preset data length, when the base station system is a short circuit, is an open circuit and has a matched load, respectively, wherein the second preset bandwidth range is larger than the first preset bandwidth range and includes the first preset bandwidth range;

determine the spectrum characteristics of the feedback signals of the RPD of the preset training sequence corresponding to each period of time, when the base station system is a short circuit, is an open circuit and has a matched load, respectively;

determine the reflection coefficient with an error term of the base station system when the base station system is a short circuit, by using the spectrum characteristics of the feedback signals of the RPD of the preset training sequence corresponding to each period of time when the base station system is a short circuit; determine the reflection coefficient with an error term of the base station system when the base station system has a matched load, by using the spectrum characteristics of the feedback signals of the RPD of the preset training sequence corresponding to each period of time when the base station system has a matched load; and determine the reflection coefficient with an error term of the base station system when the base station system is an open circuit, by using the spectrum characteristics of the feedback signals of the RPD of the preset training sequence corresponding to each period of time when the base station system is an open circuit; and determine the base station system error term, according to the reflection coefficients with an error term of the base station system when the base station system is a short circuit, is an open circuit and has a matched load.

10. The electronic device according to claim 7, wherein the at least one processor executes the computer readable program to determine the reflection coefficient with an error term of the base station system corresponding to the same period of time, on the basis of the maximum amplitude of the feedback signals of the OPD in each period of time, as well as the maximum amplitude of the feedback signals of the RPD in the same period of time by:

determining the ratio of the maximum amplitude of the feedback signals of the RPD in each period of time to the maximum amplitude of the feedback signals of the OPD in the same period of time, as the reflection coefficient with an error term of the base station system corresponding to the same period of time.

11. The device according to claim 6, wherein the at least one processor executes the computer readable program to:

after grabbing the OPD of the service signal transmitted by the base station system and the RPD of the device to be detected in the base station, remove direct currents from the OPD of the service signal transmitted by the base station system and the RPD of the device to be detected in the base station;

calibrate mirror signals of both the OPD after the direct current removal and the RPD of the device to be detected in the base station system after the direct current removal;

calibrate power amplitudes of both the OPD after calibrating the mirror signal thereof and the RPD of the device to be detected in the base station system after calibrating the mirror signal thereof; and perform synchronization compensation on the OPD after the power amplitude calibration and the RPD of the device to be detected in the base station system after the power amplitude calibration.

* * * * *